United States Patent
Dreier et al.

(10) Patent No.: US 8,392,047 B2
(45) Date of Patent: Mar. 5, 2013

(54) SYSTEM FOR PREVENTING DAMAGE TO A VEHICLE

(75) Inventors: Loren Christopher Dreier, Southern Pines, NC (US); Ingo-Gerd Sauter, Aberdeen, NC (US)

(73) Assignee: ZF Friedrichshafen AG, Friedrichshafen (DE)

( * ) Notice: Subject to any disclaimer, the term of this patent is extended or adjusted under 35 U.S.C. 154(b) by 805 days.

(21) Appl. No.: 11/809,969

(22) Filed: Jun. 4, 2007

(65) Prior Publication Data

US 2008/0300746 A1     Dec. 4, 2008

(51) Int. Cl.
*G06F 19/00* (2006.01)

(52) U.S. Cl. ............. 701/29.1; 477/76; 477/77; 477/79; 477/98

(58) Field of Classification Search .................. 180/65.2; 701/30, 29.1; 477/76, 77, 79, 90, 98; *G06F 19/00*
See application file for complete search history.

(56) References Cited

U.S. PATENT DOCUMENTS

| | | | |
|---|---|---|---|
| 4,684,917 A | 8/1987 | Tharman | |
| 4,914,982 A | 4/1990 | Ito et al. | |
| 4,947,331 A * | 8/1990 | Speranza | 701/55 |
| 4,995,357 A | 2/1991 | Gonnering et al. | |
| 5,708,412 A | 1/1998 | Proulx | |
| 5,803,863 A | 9/1998 | Hayward et al. | |
| 5,887,365 A | 3/1999 | Fujishima et al. | |
| 6,176,796 B1 | 1/2001 | Lislegard | |
| 6,208,245 B1 | 3/2001 | Post et al. | |
| 6,327,900 B1 | 12/2001 | Mc Donald et al. | |
| 6,349,680 B1 * | 2/2002 | Wolter et al. | 123/41.31 |
| 6,350,215 B1 * | 2/2002 | Gierling | 475/159 |
| 6,565,473 B2 * | 5/2003 | Endo et al. | 475/117 |
| 6,715,597 B1 * | 4/2004 | Buchanan et al. | 192/70.12 |
| 6,810,850 B2 * | 11/2004 | Anderson et al. | 123/323 |
| 6,820,708 B2 | 11/2004 | Nakamura | |
| 6,843,211 B2 | 1/2005 | Iwasaki | |
| 6,883,394 B2 * | 4/2005 | Koenig et al. | 74/335 |
| 6,915,681 B2 | 7/2005 | Kaigawa et al. | |
| 6,959,239 B2 | 10/2005 | Williams et al. | |
| 6,960,897 B2 * | 11/2005 | Hisamoto et al. | 318/434 |
| 7,002,267 B2 | 2/2006 | Raszkowski et al. | |
| 7,121,245 B2 * | 10/2006 | Tanaka et al. | 123/179.17 |
| 7,184,878 B2 * | 2/2007 | Malone et al. | 701/112 |
| 7,426,433 B1 * | 9/2008 | Wear | 701/103 |
| 7,449,994 B1 * | 11/2008 | Koerner et al. | 340/438 |
| 7,464,617 B2 * | 12/2008 | Baldascini et al. | 74/335 |

(Continued)

FOREIGN PATENT DOCUMENTS

| | | |
|---|---|---|
| DE | 101 29 072 A1 | 12/2002 |
| EP | 0 863 490 A2 | 9/1998 |

OTHER PUBLICATIONS

European Search Report issued in European application No. 08156946.9, dated Sep. 12, 2011 (8 pages).

*Primary Examiner* — Tuan C. To
(74) *Attorney, Agent, or Firm* — Brinks Hofer Gilson & Lione

(57) ABSTRACT

A system for preventing damage to a vehicle, such as a truck, is provided. A sensor may be operable to measure a parameter relating to a component in a vehicle and to provide a parameter signal indicative of the measured parameter. A processor may be in communication with the sensor and operable to receive the parameter signal from the sensor. The processor may be further operable to analyze the parameter signal. The processor may be further operable to initiate a damage prevention process including a reduction of heat generation in the vehicle based on the parameter.

16 Claims, 4 Drawing Sheets

U.S. PATENT DOCUMENTS

| | | | |
|---|---|---|---|
| 7,478,572 B2 * | 1/2009 | Maten et al. | 74/340 |
| 7,591,203 B2 * | 9/2009 | Ochi et al. | 74/331 |
| 7,702,447 B2 * | 4/2010 | Volponi | 701/100 |
| 7,937,198 B2 * | 5/2011 | Brozovich et al. | 701/33.4 |
| 8,041,779 B2 * | 10/2011 | Habaguchi et al. | 709/219 |
| 2002/0060113 A1 * | 5/2002 | Harries | 192/3.58 |
| 2003/0098147 A1 | 5/2003 | Kemmerer et al. | |
| 2003/0105566 A1 * | 6/2003 | Miller | 701/33 |
| 2003/0226416 A1 * | 12/2003 | Umemoto et al. | 74/335 |
| 2004/0038765 A1 * | 2/2004 | Fujimine et al. | 475/122 |
| 2004/0041035 A1 * | 3/2004 | Takei et al. | 236/34.5 |
| 2004/0045749 A1 * | 3/2004 | Jaura et al. | 180/65.2 |
| 2005/0165583 A1 | 7/2005 | Sarkar et al. | |
| 2006/0139177 A1 | 6/2006 | Gomery | |
| 2006/0183596 A1 | 8/2006 | Etchason et al. | |
| 2006/0194672 A1 * | 8/2006 | Ochi et al. | 477/76 |
| 2006/0213461 A1 * | 9/2006 | Hayami | 123/41.15 |
| 2007/0012276 A1 | 1/2007 | Ohara | |
| 2007/0068476 A1 * | 3/2007 | Asada | 123/179.24 |
| 2007/0093954 A1 * | 4/2007 | Malone et al. | 701/112 |
| 2007/0175726 A1 * | 8/2007 | Combes et al. | 192/87.11 |
| 2007/0182251 A1 * | 8/2007 | Miyashita et al. | 307/10.6 |

* cited by examiner

SYSTEM FOR PREVENTING DAMAGE TO A VEHICLE

FIELD OF THE INVENTION

This invention relates to vehicle systems, specifically to such systems used for preventing damage to a vehicle.

BACKGROUND

Vehicles, such as cars and trucks, are used on a daily basis for transporting people and commercial cargo as well as providing private and public services. Engines, transmissions, and other vehicle components operate under a wide range of mechanical stress, pressure, and climates. As time passes, the vehicle components experience degradation, such as oil wear, mechanical fractures, increased transmission and non-transmission assembly component temperatures, and/or oil leakage.

Adding to such degradation, many original equipment manufacturers ("OEMs") of automobile and truck-engines have opted to address increasingly restrictive federal emissions regulations with technology that involves higher engine operating temperatures, higher cooling system temperatures, and/or higher exhaust system temperatures. As a result, driveline components are subject to higher operating temperatures. It is increasingly important to monitor vehicle conditions such as transmission operating temperature, other vehicle component temperature, volume of oil in the transmission, and other features and processes in a vehicle. There is also an increasing need to prevent damage to vehicle components based on these conditions.

One method for monitoring temperature in a vehicle is to use a sensor to measure, for example, oil-sump temperature and to warn the driver of potentially dangerous temperatures via an indicator. Likewise, transmission oil volume can be monitored using sight-gauges and/or dipsticks. However, these methods provide the driver with limited information (e.g., a simple indicator light) and/or require the driver to stop and inspect the vehicle to prevent damage or further damage to the vehicle. In some cases, significant vehicle damage has already occurred before a driver can stop the vehicle. Accordingly, there is a need for improved methods and systems to prevent damage to a vehicle.

BRIEF SUMMARY

In a first aspect, a system for preventing damage to a vehicle is provided. A first sensor may be operable to measure a first parameter relating to a transmission component in a vehicle and to provide a first parameter signal indicative of the measured first parameter. A processor may be in communication with the first sensor and operable to receive the first parameter signal from the first sensor. The processor may be further operable to analyze the first parameter signal. The processor may be further operable to initiate a damage prevention process including a reduction of heat generation in the vehicle based on the first parameter.

In a second aspect, a system for preventing damage to a vehicle is provided. A sensor may be operable to measure an oil parameter and to provide an oil parameter signal indicative of the oil parameter. A processor may be in communication with the sensor that may be operable to receive the oil parameter signal. The processor may be further operable to analyze the oil parameter signal. The processor may be further operable to initiate a damage prevention process in the vehicle based on the oil parameter.

In a third aspect, a system for preventing damage to a vehicle is provided. A sensor may be operable to measure a vehicle parameter and to provide a vehicle parameter signal indicative of the vehicle parameter. A processor may be in communication with the sensor that may be operable to receive the vehicle parameter signal. A starter interlock signal device may be in communication with the processor. The starter interlock signal device may be operable to receive a starter interlock control signal from the processor. The starter interlock signal device may be further operable to generate a starter interlock signal. The processor may be further operable to analyze the vehicle parameter signal. The processor may be further operable to initiate a damage prevention process based on the vehicle parameter.

Other systems, methods, features and advantages of the invention will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PRESENTLY PREFERRED EMBODIMENTS

Figure 1:
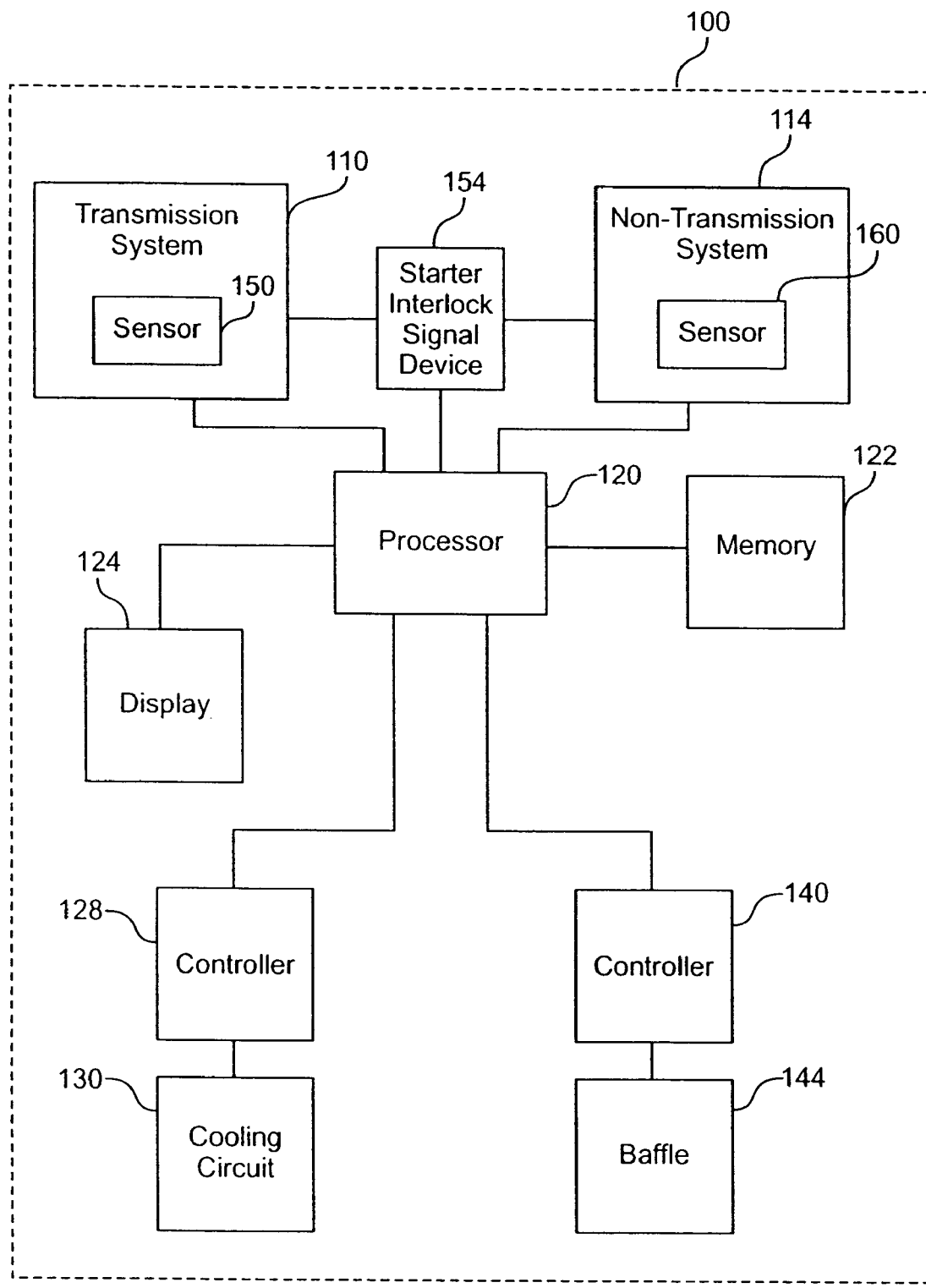
FIG. 1 is a block diagram illustrating an exemplary embodiment of system for preventing damage to a vehicle.

FIG. 1 is a block diagram illustrating an exemplary embodiment of a system for preventing damage to a vehicle 100. The vehicle 100 may be a car, bus, truck, or any other known or future vehicle that utilizes an automatic, automated mechanical, or manual transmission. The system for preventing damage may include, but is not limited to, a transmission system 110, a non-transmission system 114, a starter interlock signal device 154, a processor 120, a memory 122, a display 124, a flow port controller 128, a cooling circuit 130, a baffle controller 140, and a baffle 144.

The transmission system 110 may include, but is not limited to, a transmission, such as an automatic, automated mechanical, or manual transmission, and a sensor 150. The sensor 150 may be one sensor or a plurality of sensors capable of monitoring or measuring a parameter of a transmission component. For example, the sensor 150 may be a mechanical, electrical, and/or optical sensor that is on or in a vehicle transmission operable to measure angular velocity of a shaft, temperature of transmission oil, level of the transmission oil, and/or volumetric flow rate of the transmission oil. Alternatively, the sensor 150 may be outside of the transmission system 110.

The non-transmission system 114 may include, but is not limited to, a non-transmission assembly and sensor 160. The non-transmission assembly may be, for example, an exhaust system, engine, axle, clutch, differential, or brake of the vehicle 100. The sensor 160 may be one sensor or a plurality of sensors capable of monitoring or measuring a parameter of a non-transmission assembly component. For example, the sensor 160 may be a mechanical, electrical, and/or optical sensor that is on or in the exhaust system of the vehicle 100 operable to measure temperature of the exhaust or the exhaust pipe. The sensor 160 may be positioned on or in any part of the vehicle 100 and may be operable to measure temperature, velocity, flow rate, and volume of any non-transmission assembly component, such as non-transmission oil, of the vehicle 100.

The starter interlock signal device 154 may be in communication with the transmission system 110, the non-transmission system 114, and/or the processor 120. The starter interlock signal device 154 may be a mechanical and/or electrical switch in the transmission system 110, the non-transmission system 114, or any other section of the vehicle 100. For example, the starter interlock signal device may be a neutral switch in the transmission system 110. Also, the starter interlock signal device 154 may be in communication with a transmission controller, and the transmission controller may be in communication with or connected with a vehicle wiring harness. Alternatively, the starter interlock signal device 154 may be directly in communication with the vehicle wiring harness. The starter interlock signal device 154 may provide a starter interlock signal to drive an engine start enable relay. The starter interlock signal may be a low active signal that is asserted before an engine is allowed to start.

The display 124 may be any mechanical and/or electronic display positioned for accessible viewing by a driver or passenger of the vehicle 100. For example, the display 124 may be a light emitting diode, ("LED"), display or liquid crystal display, ("LCD"), in or on a dashboard of the vehicle 100. The display 124 may be capable of showing or illuminating various measurements, such as measurements by the sensor 150 or the sensor 160, calculations or derivations by the processor 120, and/or warnings.

The cooling circuit 130 is operable to cool or transfer heat away from transmission oil of the vehicle 100. The cooling circuit 130 may also be used for cooling other various liquids or oils that are used in the operation of the vehicle 100. The flow port controller 128 may be a single mechanical and/or electrical controller or a plurality of such controllers operable to control the operation of the cooling circuit 130. For example, the flow port controller 128 may include, but is not limited to, a solenoid. Various parts of the cooling circuit 130 may be controlled by other mechanical and/or electronic components of the vehicle 100. Also, all or parts of the cooling circuit 130 as well as the flow port controller 128 may be incorporated in the transmission system 110, the non-transmission system 114, and/or any other section of the vehicle 100.

The baffle 144 may be operable to direct or redirect air flow to any component of the vehicle 100, such as components of the transmission system 110 and/or the non-transmission system 114. The baffle may be any plate, wall, screen, or other known or future device operable to deflect air or regulate air flow. The baffle 144 may be a plurality of such devices. Furthermore, the baffle may be positioned in any part of the vehicle 100 (e.g., the front of the vehicle 100) and may be electronically controlled by the baffle controller 140. The baffle controller 140 may be a single mechanical and/or electrical controller or a plurality of such controllers.

The processor 120 may be in communication with the memory 122, the sensor 150, the sensor 160, the starter interlock signal device 154, the display 124, the flow port controller 128, and the baffle controller 140. The processor 120 may be in communication with any other component of the transmission system 110 and/or the non-transmission system 114, such as a transmission controller, other vehicle controllers, or various electronics in the vehicle 100. The memory 122 may also be in communication with the sensors 150 and 160, the vehicle controllers, and the various electronics in the vehicle 100. The processor 120 and the memory 122 may be in the transmission system 110, the non-transmission system 114, and/or any other section of the vehicle 100. Also, the processor 120 may be a main processor or a plurality of processors operable to communicate with electronics and controllers of the vehicle 100. For example, the processor 120 may be part of a public or private communications area network ("CAN"). The processor 120 may utilize a public electronic communication protocol, such as SAE J 1939 or SAE J 1587, and/or may utilize a proprietary electronic communication protocol or any other type of public or private communication technique.

The system for preventing damage may perform a variety of processes or actions to prevent damage to the vehicle 100. Damage to the vehicle 100 may include, but is not limited to, bluing or blackening of gears when the temperature in the transmission system 110 and/or the non-transmission system 114 rises to a high level, breaking or fracturing of the gears because of high temperatures, oil breakdown, and bearing seizures. Blued or blackened gears may signify that the gear is approaching a physical break or fracture. Other damage may include transmission and/or non-transmission system 114 breakdown when there is a low level oil or no oil, other vehicle component malfunctions, and/or generation of smoke and fire.

As the vehicle 100 is moving, the sensor 160 may continuously or periodically measure a non-transmission assembly component in a non-transmission assembly. For example, the sensor 160 may measure temperature of an exhaust pipe or exhaust and/or non-transmission oil and send the temperature data to the processor 120. When the temperature of the exhaust pipe or exhaust and/or non-transmission oil reaches or rises above a predetermined threshold, the processor may communicate with the baffle controller 140 to adjust the baffle 144 to redirect or route air over the some part of or the entire exhaust system and/or some part of or the entire non-transmission assembly associated with the non-transmission oil to facilitate convective cooling. Similarly, as the vehicle 100 is moving, the sensor 150 may continuously or periodically monitor a transmission component. For example, the sensor 150 may monitor temperature of the transmission oil and send the temperature data to the processor 120. When the temperature of the oil reaches or rises above a predetermined threshold, the processor may communicate with the baffle controller 140 to adjust the baffle 144 to redirect or route air over the transmission to facilitate convective cooling. The baffle 144 may be adjusted to redirect or route air to any component of the vehicle 100 to facilitate convective cooling.

Another example of preventing damage to the vehicle 100 is to prohibit or discontinue exhaust gas re-circulation, ("EGR"). EGR may include heating the exhaust gas to a high enough temperature to ensure particulate matter oxidation. This heating may occur in the exhaust system, and the hot exhaust gases may be routed in an area near the transmission system 1 10. Therefore, for example, the sensors 150 and 160 may monitor the temperature of the transmission system 110 and the non-transmission system 114, respectively. The processor 120 may analyze the temperature data and prohibit or discontinue EGR when the temperature of a transmission component, such as transmission oil, and/or the temperature of a non-transmission assembly component, such as an exhaust pipe or exhaust, reaches or rises above a predetermined threshold. The decision to prohibit or discontinue EGR may occur when the vehicle 100 is moving or at a standstill.

Furthermore, when the temperature of a component in the transmission system 110 and/or the non-transmission system 114 reaches or is above a predetermined threshold, ignition may be prohibited. For example, the sensor 150 may continuously or periodically measure temperature the transmission oil and send the temperature data to the processor 120. The processor 120 may analyze the data and send commands to the starter interlock signal device 154 to disable the starter interlock signal when the temperature is too high. Alternatively, the sensor 150 may directly communicate with the starter interlock signal device 154. Or, the sensor 150 may directly send a signal to any part of the vehicle 100 to shut down all or some power. For example, the sensor 150 may directly send a signal to the vehicle wiring harness to prohibit ignition.

Furthermore, ignition may be prohibited when there is not enough oil in the transmission and/or non-transmission system. Oil levels of the transmission may drop if there is leakage or may be low because of other reasons, for example, if not enough oil was deposited in the transmission. For example, the sensor 150 may continuously or periodically measure the level of oil or volumetric flow rate of oil in the transmission. The processor 120 may analyze that data and determine if the oil level or volumetric flow rate is sufficient for operation of the vehicle 100. If the oil level or volumetric flow rate reaches or is below a predetermined threshold, the processor 120 may send commands to the starter interlock signal device 154 to disable the starter interlock signal. Alternatively, the sensor 150 may directly communicate with the starter interlock signal device 154. Or, the sensor 150 may directly send a signal to any part of the vehicle 100 to shut down all or some power. For example, the sensor 150 may directly send a signal to the vehicle wiring harness to prohibit ignition.

Alternatively, the sensor 160 may continuously or periodically measure temperature of components in the non-transmission system 114 and send the temperature data to the processor 120. The processor 120 may analyze the data and send commands to the starter interlock signal device 154 to disable the starter interlock signal when the temperature is too high. Alternatively, the sensor 160 may directly communicate with the starter interlock signal device 154. Or, the sensor 160 may directly send a signal to any part of the vehicle 100 to shut down all or some power. For example, the sensor 160 may directly send a signal to the vehicle wiring harness to prohibit ignition.

Also, the processor 120 may be operable to calculate a time period before damage to the vehicle 100 occurs. For example, when the vehicle 100 is moving, the sensor 150 and/or 160 may continuously or periodically measure the level of oil or volumetric flow rate of oil in the transmission and/or in a non-transmission assembly, respectively. The processor 120 may analyze that data and compare it to empirical or stored data that correlates different volumes of oil to specific damage. Therefore, if there is a leak and the volume of oil is decreasing or if the volume of oil is at a constant low level, the processor 120 may calculate a time period before damage will occur to the vehicle 100 based on interpolation and/or extrapolation of the stored data. This time period may be displayed on the display 124 in a countdown fashion. Alternatively, the driver may be continuously or periodically warned via a series of flashing or constant lights and/or alarms by visual and/or audio indicators. Also, the oil level may be displayed on the display 124 to warn the driver. If the time period is substantially short, such as about zero seconds or minutes, the processor 120 may initiate other damage prevention processes immediately.

Similarly, when the vehicle 100 is moving, the sensors 150 and 160 may measure the temperature of the transmission system 110 and the non-transmission system 114, respectively, and the processor 120 may determine a time period before damage occurs based on temperature. For example, the sensor 150 may continuously or periodically measure temperature of the transmission oil and send the temperature data to the processor 120. The processor 120 may analyze that data and compare it to empirical or stored data that correlates different temperatures to specific damage. The processor 120 may calculate a time period before damage will occur to the vehicle 100 based on interpolation and/or extrapolation of the stored data. This time period may be displayed on the display 124 in a countdown fashion. Alternatively, the driver may be continuously or periodically warned via a series of flashing or constant lights and/or alarms by visual and/or audio indicators. If the time period is substantially short, such as about zero seconds or minutes, the processor 120 may initiate other damage prevention processes immediately.

The processor 120 may be operable to correlate transmission and/or non-transmission oil temperature and transmission and/or non-transmission oil level or volume. Empirical or stored data linking different oil levels or oil volumes with respective oil temperatures may be provided. Also, equations including variables for pressure, volume, and temperature may be used to correlate transmission and/or non-transmission oil temperature and transmission and/or non-transmission oil level or volume. For example, the sensor 150 and/or 160 may continuously or periodically measure the transmission and/or non-transmission oil temperature and send the temperature data to the processor 120. The processor 120 may analyze that data and calculate the oil level or volume based on interpolation or extrapolation of the stored data and/or calculation of an equation that relates volume and temperature of the oil. Based on the determination of oil level or volume, the processor 120 may send commands, if appropriate, to initiate damage prevention processes discussed above. Alternatively, the sensor 150 and/or 160 may monitor oil level or volumetric flow rate, and the processor 120 may calculate an oil temperature based on the measured data and act accordingly.

Damage may occur to the vehicle 100 due to transmission and/or non-transmission oil wear. Oil may be designed to lubricate gears and other components, but the lubrication quality may decline as the oil ages, which results in more heat generation. Also, as oil ages, residual metals and sludge may build up adding to the heat generation. Therefore, the processor 120 may be operable to calculate or determine oil life or oil wear of the transmission system 110 and/or non-transmission system 114. Empirical or stored data linking oil life or wear with oil temperatures may be provided. For example, the sensor 150 and/or 160 may continuously or periodically measure the oil temperature and send the temperature data to the processor 120. The processor 120 may analyze that data and calculate the oil life or wear based on interpolation or extrapolation of the stored data and/or calculation of various equations or mathematical computations. Empirical or stored data relating oil quality or life to specific damage to the vehicle 100 may be provided as well. The oil life may be displayed on the display 124 in a countdown fashion to warn the driver of when to change the oil and/or when damage to the vehicle 100 is likely to occur. Alternatively, the display 124 may show a date and time for a driver to act and/or may show a series of flashing or constant lights. A quality level of the oil wear may also be shown on the display 124.

Figure 2:
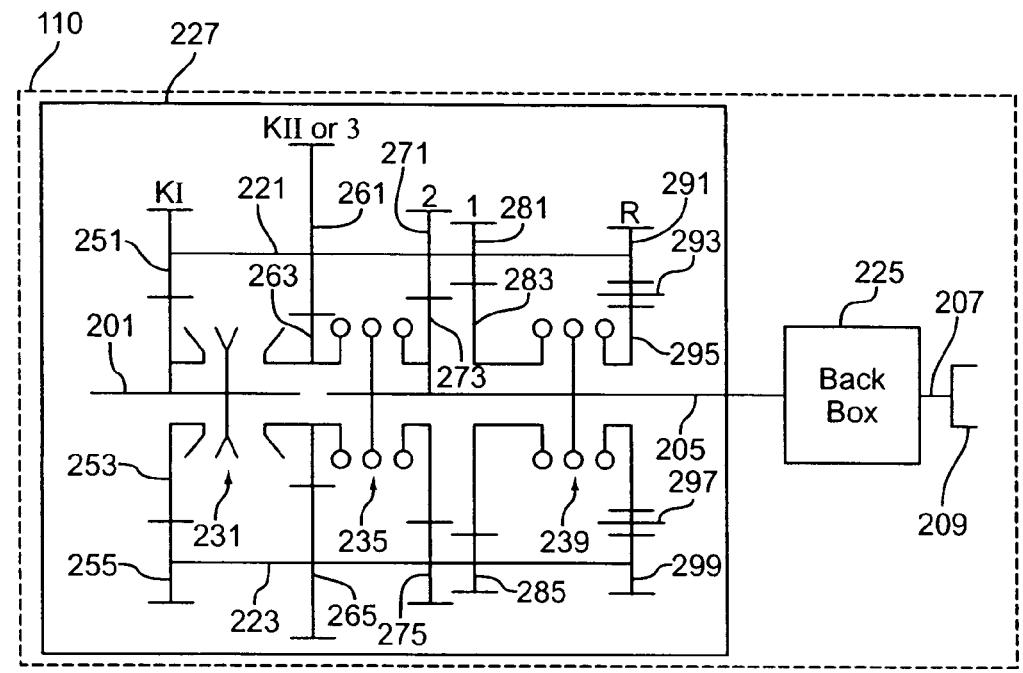
FIG. 2 is a schematic and a torque flow diagram illustrating an exemplary embodiment of a transmission system used in the system of FIG. 1.
Figure 2:
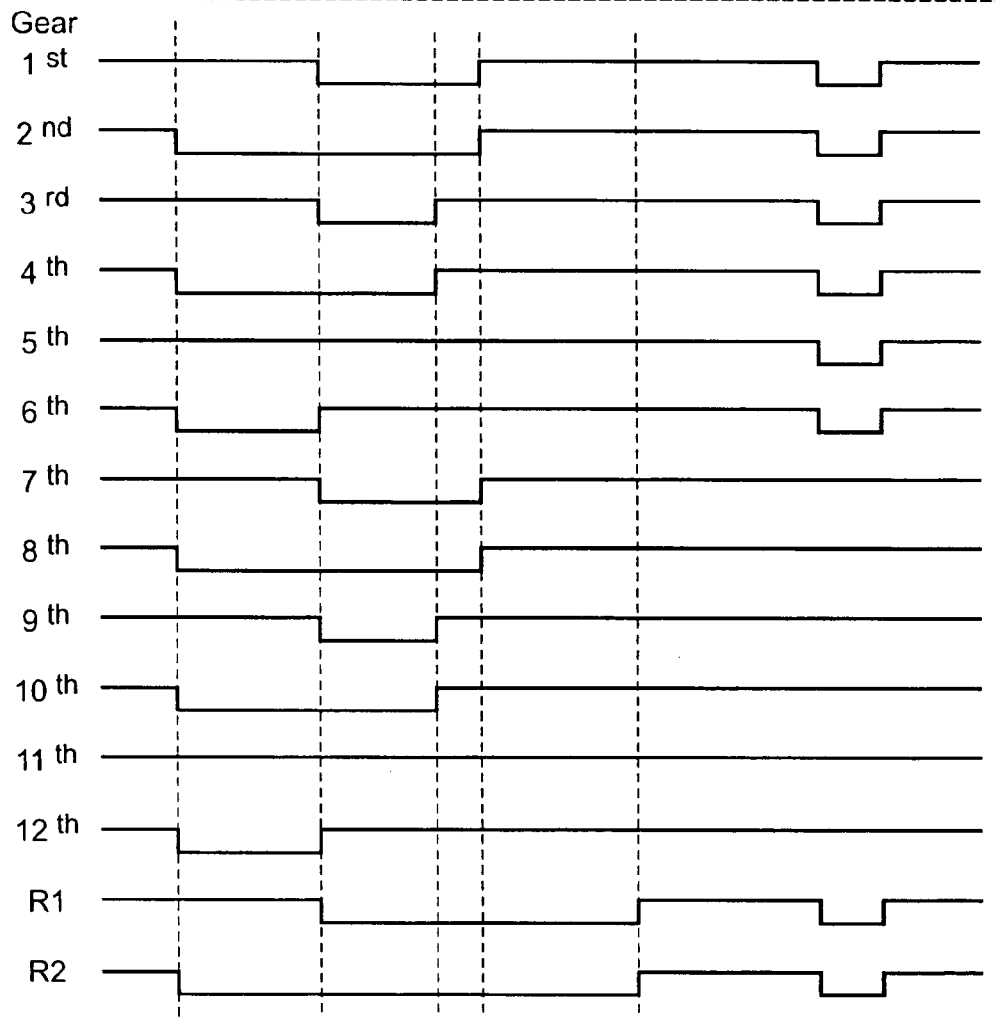

FIG. 2 is a schematic and a torque flow diagram illustrating an exemplary embodiment of a transmission system, such as the transmission system 110 of FIG. 1. The transmission system 110 may include a twelve speed overdrive transmission with two reverse gear settings designated R1 and R2 and 12 forward gear settings designated $1^{st}$, $2^{nd}$, $3^{rd}$ . . . , $12^{th}$, which are typically referred to as R1 gear, R2 gear, $1^{st}$ gear, . . . $12^{th}$ gear, respectively. The transmission may include, but is not limited to, an input shaft 201, a main shaft 205, counter shafts 221 and 223, a back box 225, and an output shaft 207. The transmission may include gear arrangements designated as KI, KII or 3, 2, 1, and R.

The gear arrangement KI may include a gear 251 that may be fixed on the counter shaft 221, a gear 255 that may be fixed on the counter shaft 223, and a gear 253 that may be operable to rotate around the input shaft 201. The gear arrangement KII or 3 may include a gear 261 that may be fixed on the counter shaft 221, a gear 265 that may be fixed on the counter shaft 223, and a gear 263 that may be operable to rotate around the input shaft 201. A synchronizer 231 may engage the gear 253 to rotate it about the input shaft 201 and, therefore, rotate gears 251 and 255. Also, the synchronizer 231 may engage the gear 263 to rotate it about the input shaft 201 and, therefore, rotate gears 261 and 265.

The gear arrangement 2 may include a gear 271 that may be fixed on the counter shaft 221, a gear 275 that may be fixed on the counter shaft 223, and a gear 273 that may be operable to rotate about the main shaft 205. A dog clutch 235 may engage the gear 263 allowing the main shaft 205 to rotate based on the gear arrangement KII or 3. The dog clutch 235 may engage the gear 273 allowing the main shaft 205 to rotate based on the gear arrangement 2.

The gear arrangement 1 may include, a gear 281 that may be fixed on the counter shaft 221, a gear 285 that may be fixed on the counter shaft 223, and a gear 283 that may be operable to rotate about the main shaft 205. The gear arrangement R may include a gear 291 that may be fixed on the counter shaft 221, a gear 299 that may be fixed on the counter shaft 223, idler gears 293 and 297 that may be operable to reverse the direction of rotation, and a gear 295 that may be operable to rotate about the main shaft 205. A dog clutch 239 may engage the gear 283 allowing the main shaft 205 to rotate based on the gear arrangement 1. The dog clutch 239 may engage the gear 295 allowing the main shaft 205 to rotate based on the gear arrangement R.

The back box 225 may be a planetary back box that may include, but is not limited to, a sun gear, planetary gears (e.g., three planetary gears), and a synchronizer. The output shaft 207 may be operatively coupled to the back box 225. A yoke 209 may be attached to the output shaft 207, and the yoke 209 may connect with a drive line, drive shaft, or propeller shaft.

Based on the engagement of the various synchronizers and dog clutches, such as synchronizer 231 and dog clutches 235 and 239, twelve different forward gear settings and two reverse settings may be provided. The torque or power flow through the transmission may vary depending on what gear setting the transmission is in. For example, referring to FIG. 2, $1^{st}$ gear may occur when the synchronizer 231 is engaged with the gear 263 and the dog clutch 239 is engaged with the gear 283. In this case, the input shaft 201 may rotate the gear 263, which in turn rotates the counter shafts 221 and 223 via the gears 261 and 265, respectively. The gear 283 may rotate the main shaft 205 via the gears 281 and 285. Therefore, the torque or power may flow through the input shaft 201 to the counter shafts 221 and 223 via the gear arrangement KII or 3 and down to the main shaft 205 via the gear arrangement 1, as shown by the power or torque pattern in FIG. 2.

Typically, the more individual gears that are engaged, the more heat the transmission generates. Therefore, when a component temperature of the transmission system 110 and/or the non-transmission system 114 reaches or rises above a predetermined threshold, the system for preventing damage to the vehicle 100 may shift to a gear setting that minimizes the number of engaged gears, such as direct gear. For example, as the vehicle is moving, the sensors 150 and 160 may continuously or periodically measure the temperature of transmission oil and/or the temperature of the exhaust pipe or exhaust, respectively. Other components may be monitored as well. When the temperature of the oil and/or the exhaust pipe or exhaust reaches or rises above the predetermined threshold, the processor 120 may send commands to the transmission system 110 (e.g., via a transmission controller) to shift to a direct gear to reduce heat generation.

Referring to FIG. 2, $5^{th}$ and $11^{th}$ gear are direct gears in a front box 227. The synchronizer 231 and the dog clutch 235 may simultaneously engage gear 263 directly connecting the input shaft 201 and the main shaft 205. Therefore, the torque or power may flow directly through the input shaft 201 and the main shaft 205. The torque flow to the output shaft 207 may depend on the engagement of gears within the back box 225. The $11^{th}$ gear has direct torque or power flow from the input shaft 201 to the output shaft 207, thus $11^{th}$ gear may also be a direct gear in the back box 225. $5^{th}$ gear shows a jog in the torque or power flow based on a gear arrangement within the back box 225. Therefore, the processor 120 may command the transmission system 110 to shift to $11^{th}$ gear at higher speeds to reduce heat generation and shift to $5^{th}$ gear at lower speeds to reduce heat generation. Therefore, shifting to a direct gear reduces heat generated in the transmission.

Any type of transmission with any number of drive speeds may be used with the system for preventing damage to the vehicle 100. Some or all of the gears of the transmission may continuously rotate even if they are not engaged. Also, the diameters of the gears may vary.

The diameter or size of the gears may also affect the generation of heat in the transmission system 110. The counter shafts 221 and 223 as well as their associated gears may reach into an oil sump. The other shafts, such as the input shaft 201, the main shaft 205, and the output shaft 207, and their associated gears may also reach into the oil sump. As the gears turn, they may displace or churn a certain amount of oil, which generates heat. Therefore, when a component temperature of the transmission system 110 and/or the non-transmission system 114 reaches or rises above a predetermined threshold, the system for preventing damage to the vehicle 100 may shift to a gear arrangement having gears with smaller diameters to displace less oil and reduce heat generation.

For example, as the vehicle is moving, the sensors 150 and 160 may continuously or periodically measure the temperature of oil and/or the temperature of the exhaust pipe or exhaust, respectively. Other components may be monitored as well. When the temperature of the oil and/or the exhaust pipe or exhaust reaches or rises above the predetermined threshold, the processor 120 may send commands to the transmission system 110 (e.g., via a transmission controller) to shift to a gear or gear arrangement that utilizes gears with smaller diameters to displace less oil in the oil sump. The displacement of less oil generates less heat. However, the use of smaller diameter gears may generate more torque. Therefore, the processor 120 may be operable to weigh and calculate the benefits of heat reduction based on displacement of oil versus torque generated. The processor may send a command to the transmission system 110 for choosing a gear set based on the calculated benefits. Alternatively, the processor may send a pattern of different commands to switch between gears sets, including a shift to a direct gear, based on the benefits of heat reduction at a given time. Also, the system for preventing damage to the vehicle 100 may shift to or prohibit a shift to any gear of the transmission system 110 to reduce heat generation. Also, empirical data may be developed to define which gear arrangements generate the least amount of heat. This data may be used in the system for preventing damage to the vehicle 100 to shift to gear arrangements having the least amount of heat generation.

Figure 3:
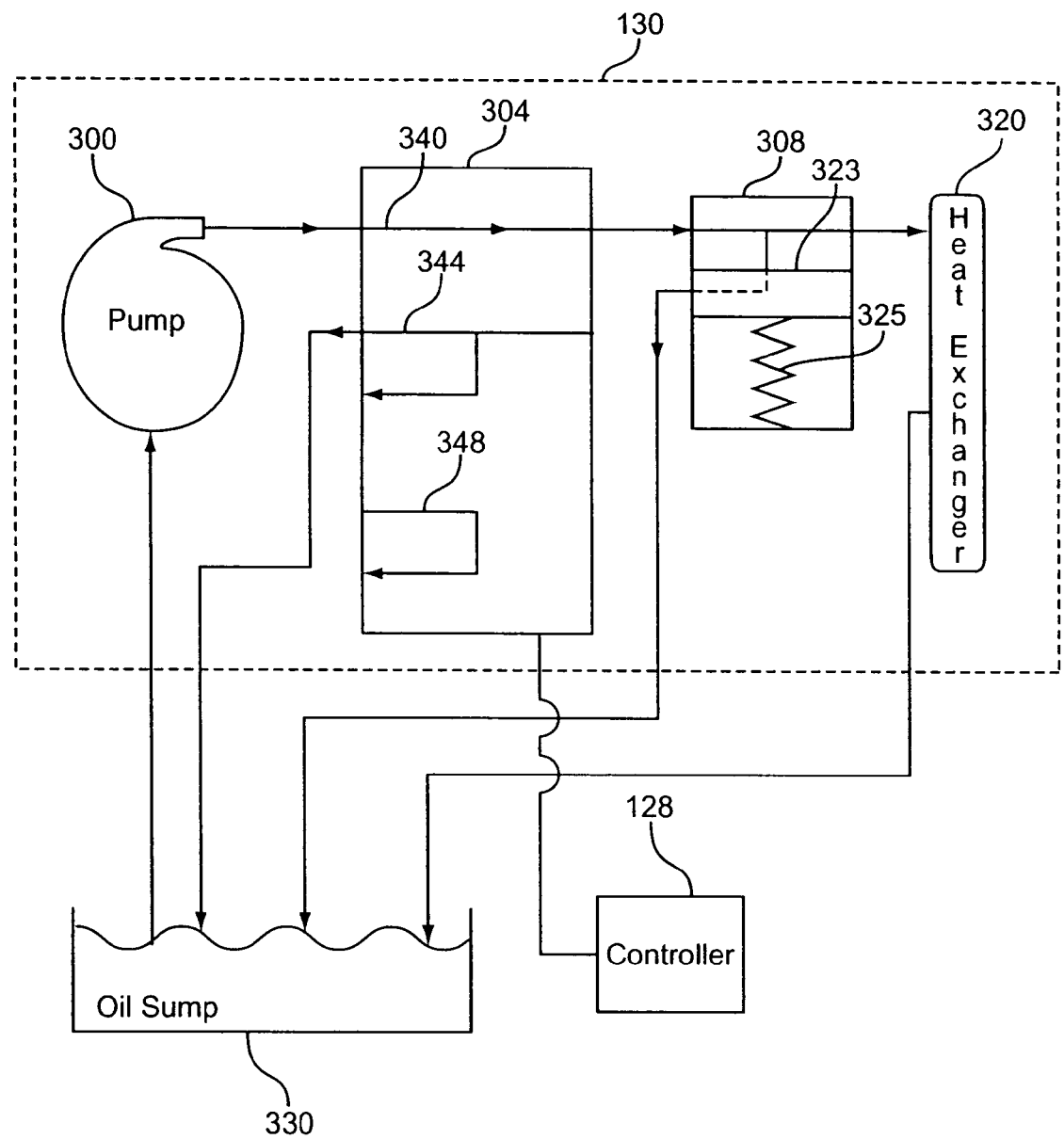
FIG. 3 is a schematic diagram illustrating an exemplary embodiment of a cooling circuit used in the system of FIG. 1.

FIG. 3 is a schematic diagram illustrating an exemplary embodiment of a cooling circuit, such as the cooling circuit 130 of FIG. 1. The cooling circuit 130 may include, but is not limited to, an oil pump 300, a variable flow bypass 304, a pressure bypass 308, and a heat exchanger 320. The cooling circuit 130 may be operable to cool or transfer heat away from the oil of the transmission and/or oil of non-transmission assemblies.

For example, the pump may take in oil from an oil sump 330. The pump 300 may output the oil to the variable flow bypass 304. The oil may flow through a path 340 of the variable flow bypass 304 to a pressure bypass 308. The pressure bypass 308 may be operable to protect the heat exchanger 320. For example, if the pressure of the oil is above a predetermined threshold or great enough to move a piston 323 that is supported by a spring 325, then the oil returns to the oil sump 330 without passing through the heat exchanger 320. This is to protect the heat exchanger 320 from excessive or high oil pressures that may physically damage the heat exchanger 320. If the pressure of the oil is below the predetermined threshold, then the oil passes through the heat exchanger 320, which cools the oil, and the oil returns to the oil sump 330.

The variable flow bypass 304 may have three flow paths including, but not limited to, the path 340, a path 344, and a path 348. As mentioned above, the flow path 340 may route the oil from the pump 300 to the pressure bypass 308. The path 344 may route a portion of the oil to the pressure bypass 308 and the other portion to the oil sump 330. The path 348 may route all of the oil back to the oil sump 330, bypassing both the pressure bypass 308 and the heat exchanger 320.

The variable flow bypass 304 may be utilized for preventing damage to the vehicle 100. For example, the sensor 150 may continuously or periodically measure the level of oil or volumetric flow rate of oil in the transmission. The processor 120 may analyze that data and determine if the oil level or volumetric flow rate is sufficient for operation of the vehicle 100. If the oil level or volumetric flow rate reaches or is below a predetermined threshold (e.g., there is an oil leak or not enough oil was deposited in the transmission), the processor 120 may send commands to the flow port controller 128 to select a flow path. The processor 120 may determine that the oil level or volume is too low and command the flow port controller 128 to select the path 348. In this case, all of the oil may bypass the pressure bypass 308 and the heat exchanger 320 to keep as much oil as possible in the transmission. Alternatively, if the processor 120 decides that the oil level is low but the oil is also at a certain temperature, the processor 120 may command the controller 128 to select the path 344. In this case, a selected portion of the oil may bypass the pressure bypass 308 and the heat exchanger 320 to keep some oil in the transmission system 110 and the other portion of oil may be sent to the heat exchanger 320 for cooling. The path 344 may be designed with two constant flow paths for the respective portions of oil or may have varying flow paths allowing for a precise selection of oil to be diverted to the heat exchanger 320 or oil sump 330.

Alternatively, the cooling circuit 130 may prevent damage to the vehicle 100 by increasing oil flow rate to the heat exchanger 320. For example, the sensor 150 and/or 160 may continuously or periodically measure temperature of the transmission oil and/or non-transmission oil and send the temperature data to the processor 120. The processor 120 may analyze the data and send commands to the pump 300 to increase the flow of oil when the oil temperature is too high or above a predetermined threshold. Alternatively, the processor 120 may send commands to the flow port controller 128 to increase the diameter of the paths of the variable flow bypass 304 that direct the oil to the heat exchanger 320.

Also, in cold weather or climates, the oil may become highly viscous. The thick oil may cause performance problems as well as damage to the vehicle. Therefore, the sensor 150 and/or 160 may monitor or measure the oil viscosity and/or temperature and send that data to the processor 120. The processor 120 may analyze the data to determine if the oil temperature is too low or below a predetermined threshold and/or if the oil is too viscous, thick, or above a predetermined threshold. If the oil is too cold or viscous, the processor 120 may command the flow port controller 128 to select the path 344 or 348 to keep all or some of the oil from entering the heat exchanger 320 to heat the oil faster and avoid any damage to the vehicle 100.

The flow port controller 128 is not limited to controlling the variable flow bypass 304. The flow port controller 128 may be operable to control and/or communicate with any other part of the cooling circuit 130.

Figure 4:
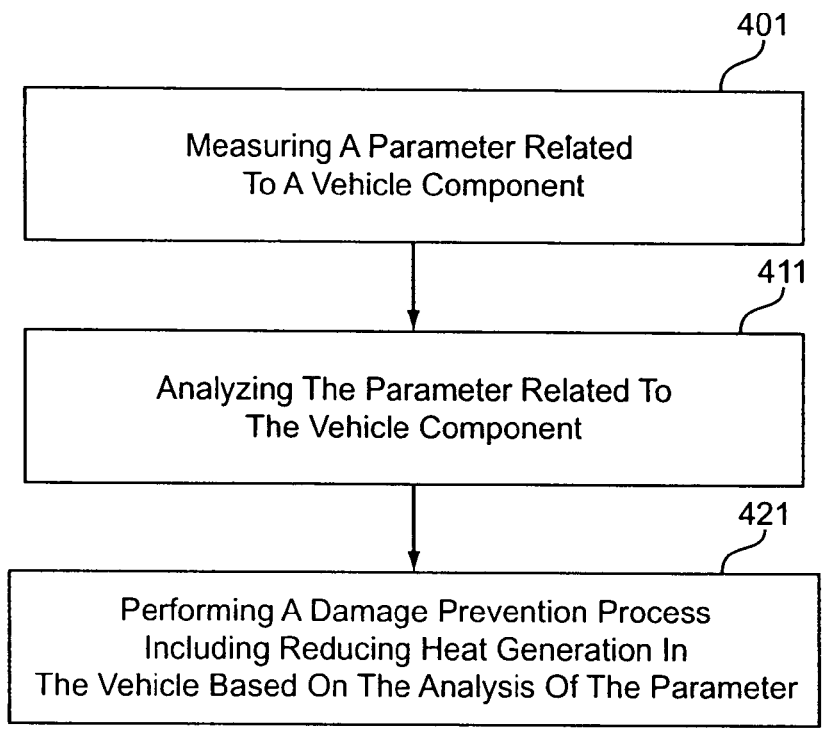
FIG. 4 is a flowchart illustrating an example of a method for preventing damage to a vehicle.

FIG. 4 is a flowchart illustrating an example of a method for preventing damage to the vehicle 100. In act 401, a parameter of a vehicle component may be measured or monitored. The vehicle component may be a transmission and/or non-transmission assembly. The transmission component may be oil of the transmission, and the non-transmission assembly component may be, for example, an exhaust pipe or exhaust. The parameter may be angular velocity of a shaft or gear, temperature of the transmission component or non-transmission assembly component, or volume, level, or volumetric flow rate of a component, such as transmission and/or non-transmission oil. Sensors that may be located at various positions in the vehicle 100, such as the sensors 150 and 160, may monitor or measure such parameters.

In act 411, the parameter of the vehicle component may be analyzed. A processor or a plurality of processors may analyze the measured data. The analysis may include, but is not limited to, determining if a parameter is above or below a predetermined threshold, interpolating and/or extrapolating stored data, comparing measured data with stored data, calculating a time period before damage occurs to a vehicle, such as vehicle 100, correlating oil temperature and oil volume or level, and determining oil life or wear based on the temperature of the oil.

In act 421, a damage prevention process including reducing heat generation in the vehicle based on the analysis of the parameter may be performed. Reducing heat generation may include, but is not limited to, shifting to a direct gear, shifting to a gear that displaces or churns less oil, prohibiting or discontinuing EGR, redirecting or routing air to a non-transmission assembly or a transmission, and increasing flow rate in a cooler circuit. Other damage prevention processes may include warning a driver of oil life or wear, level of oil, and a time period before damage will occur to the vehicle, as well as, prohibiting ignition based on oil level or temperature of a transmission and/or non-transmission assembly component, and bypassing oil or a selected portion of oil away from a heat exchanger based on oil level or temperature.

Figure 5:
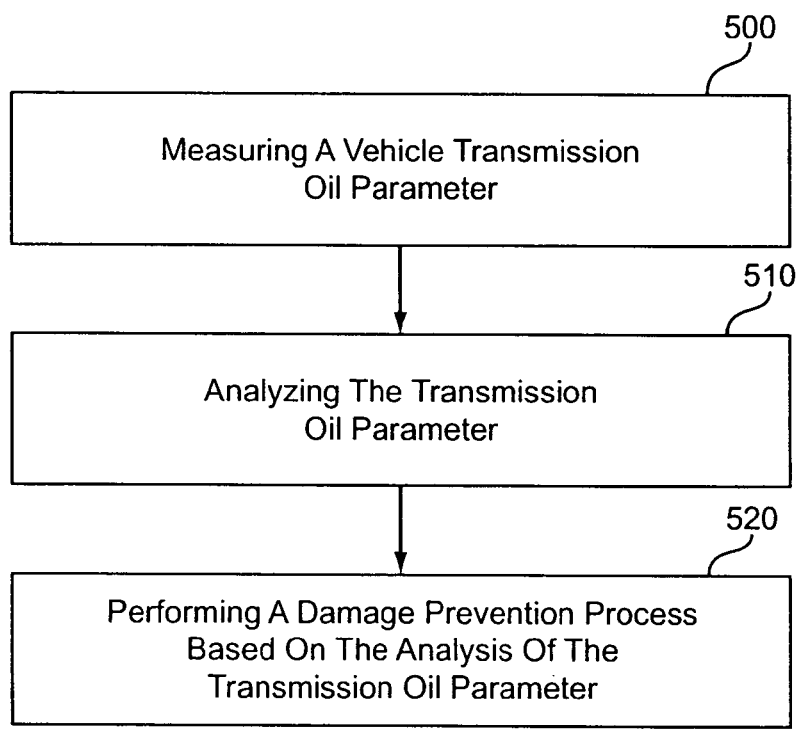
FIG. 5 is a flowchart illustrating another example of a method for preventing damage to a vehicle.

FIG. 5 is a flowchart illustrating another example of a method for preventing damage to a vehicle. In act 500, a parameter of oil of a vehicle transmission and/or a non-transmission assembly may be monitored or measured. The parameter may be oil temperature, level, volume, volumetric flow rate, or viscosity. In act 510, the parameter of the oil of the vehicle transmission may be analyzed. The analysis includes, but is not limited to, determining a time period before damage to the vehicle based on the oil level or the volumetric flow rate of the oil, correlating oil temperature and the oil level of the volumetric flow rate of the oil, and other analyses discussed above. In act 520, a damage prevention process may be performed based on the analysis of the oil. The damage prevention process may include, but is not limited to, warning a driver about the time period before damage to the vehicle, bypassing the oil or a selected amount of the oil away from a heat exchanger when the oil level or the volumetric flow rate of the oil is below a predetermined threshold, prohibiting ignition when the oil level is too low or if the oil temperature is too high, and any other damage preventing process related to transmission oil discussed above.

Referring to FIG. 1, the memory 122 may include instructions for performing the steps of any of the methods, processes, calculations, or features described above. The memory 122 may be a "computer-readable medium," "machine-readable medium," "propagated-signal" medium, and/or "signal-bearing medium" and may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Although selected aspects, features, or components of the implementations are depicted as being stored in memories, all or part of the systems, including processes and/or instructions for performing processes, consistent with the system may be stored on, distributed across, or read from other machine-readable media, for example, secondary storage devices such as hard disks, floppy disks, and CD-ROMs; a signal received from a network; or other forms of ROM or RAM, some of which may be written to and read from in a vehicle, such as the vehicle 100.

Any of the features, processes, or methods discussed above may be mixed and matched together to create a variety of damage preventing systems and/or methods for a vehicle, such as a truck. Also, the system for preventing damage to a vehicle described above may be in communication with a remote station or device via any variety of wireless networks and/or protocols. An operator at the remote station or operating the remote device may initiate any of the damage preventing processes discussed above.

It is intended that the foregoing detailed description be regarded as illustrative rather than limiting, and that it be understood that the following claims, including all equivalents, are intended to define the scope of this invention. The claims may include the phrase "one of A and B" as an alternative expression that means one or more of A or one or more of B.

The invention claimed is:

1. A system for preventing damage to a vehicle comprising:
a first sensor operable to measure a first parameter relating to a transmission component in a vehicle and to generate a first parameter signal indicative of the measured first parameter; and
a processor in communication with the first sensor and operable to receive the first parameter signal from the first sensor,
wherein the processor is further operable to analyze the first parameter signal, and
wherein the processor is further operable to initiate a damage prevention process that reduces heat generation in the transmission based on the first parameter, wherein initiating a damage prevention process comprises at least one of:
shifting a transmission to a direct gear;
shifting the transmission to a gear that displaces less oil than the gear being used when the first parameter is generated; and
prohibiting exhaust gas regeneration.

2. The system of claim 1 further comprising:
a second sensor in communication with the processor and operable to measure a second parameter relating to a non-transmission assembly component in the vehicle and to provide a second parameter signal indicative of the second parameter,
wherein the processor is further operable to receive the second parameter signal,
wherein the processor is further operable to analyze the second parameter, and
wherein the processor is further operable to initiate the damage prevention process based on the second parameter.

3. The system of claim 2, wherein the non-transmission assembly component comprises an exhaust pipe, and the second parameter of the non-transmission assembly component comprises a temperature of the exhaust pipe.

4. The system of claim 1, wherein the transmission component comprises oil, and the first parameter of the transmission component comprises at least one of a temperature of the oil and a volume of the oil.

5. The system of claim 4, wherein the processor is further operable to correlate at least one of the temperature of the oil and the volume of the oil.

6. The system of claim 1, wherein the processor is further operable to determine a time period before damage occurs to the vehicle, and the time period is incorporated with the damage prevention process.

7. A system for preventing damage to a vehicle comprising:
a first sensor operable to measure a first parameter relating to a transmission component in a vehicle and to provide a first parameter signal indicative of the measured first parameter; and
a processor in communication with the first sensor and operable to receive the first parameter signal from the first sensor,
wherein the processor is further operable to analyze the first parameter signal and determine a time period before damage occurs to the vehicle, and wherein the processor is further operable to initiate a damage prevention process including a reduction of heat generation in the vehicle based on the first parameter and the time period by initiating at least one of:

shifting a transmission to a direct gear;

shifting the transmission to a gear that displaces less oil than the gear being used when the first parameter is generated; and prohibiting exhaust gas regeneration.

8. The system of claim 7 further comprising:

a second sensor in communication with the processor and operable to measure a second parameter relating to a non-transmission assembly component in the vehicle and to provide a second parameter signal indicative of the second parameter, wherein the processor is further operable to receive the second parameter signal, wherein the processor is further operable to analyze the second parameter, and wherein the processor is further operable to initiate a damage prevention process including reducing heat generation in the vehicle based on the second parameter.

9. The system of claim 8, wherein the non-transmission assembly component comprises an exhaust pipe, and the second parameter of the non-transmission assembly component comprises a temperature of the exhaust pipe.

10. The system of claim 7, wherein the transmission component comprises oil, and the first parameter of the transmission component comprises at least one of a temperature of the oil and a volume of the oil.

11. The system of claim 10, wherein the processor is further operable to correlate at least one of the temperature of the oil and the volume of the oil.

12. The system of claim 7, wherein the processor is further operable to initiate a shift to a direct gear as part of the damage prevention process.

13. The system of claim 7, wherein the processor is further operable to initiate an increase of a flow rate in a cooler circuit as part of the damage prevention process.

14. The system of claim 7, wherein the processor is further operable to initiate a prohibition of exhaust gas regeneration as part of the damage prevention process.

15. The system of claim 7, wherein the processor is further operable to initiate a shift to a gear operable to displace less oil as part of the damage prevention process.

16. The system of claim 7, wherein the processor is further operable to enable a warning indicator configured to warn a driver about the time period.

\* \* \* \* \*